United States Patent
Alleva et al.

[11] 3,903,588
[45] Sept. 9, 1975

[54] METHOD OF SECURING CABLE TO A BULKHEAD

[75] Inventors: Leon L. Alleva; Ralph G. D'Ascoli, both of Yonkers, N.Y.

[73] Assignee: The Anaconda Company, New York, N.Y.

[22] Filed: June 5, 1974

[21] Appl. No.: 476,486

Related U.S. Application Data

[62] Division of Ser. No. 354,063, April 24, 1973, Pat. No. 3,855,414.

[52] U.S. Cl. .............................. 29/461; 29/203 R
[51] Int. Cl.² ............................ B23P 25/00
[58] Field of Search ......... 29/461, 203 R; 24/122.6; 174/89, 90

[56] References Cited
UNITED STATES PATENTS

| | | |
|---|---|---|
| 1,978,164 | 10/1934 | Van Inwagen et al. ........ 29/461 UX |
| 2,877,031 | 3/1959 | Lee ........................ 174/89 X |
| 3,054,848 | 9/1962 | Reesby et al. ............. 174/89 |
| 3,633,265 | 1/1972 | Lyashenko ................. 29/461 |

FOREIGN PATENTS OR APPLICATIONS 846,186   9/1939   France .................... 174/90

*Primary Examiner*—Charlie T. Moon
*Attorney, Agent, or Firm*—Pennie & Edmonds

[57] ABSTRACT

To secure a double layer of armor wires of a cable to a bulkhead forming the wall of a splice casing, a pair of heavy rings are aligned between two plates. The armor wires of each layer are folded around one of the rings and gripped by tightening bolts that connect the plates, one of which is then bolted to the bulkhead. An armor holding tool and method of using are also described.

2 Claims, 18 Drawing Figures

3,903,588

METHOD OF SECURING CABLE TO A BULKHEAD

This is a division of application Ser. No. 354,063 filed Apr. 24, 1973, now U.S. Pat. No. 3,855,414.

BACKGROUND OF THE INVENTION

In application Kothe et al. Ser. No. 116,845, filed Feb. 19, 1971, now abandoned and assigned to the present assignee, there has been described a cable system wherein electric cables comprising two layers of flat armor wire form a continuous tensile system with the splice casings, by which lengths of the cable are connected. To this purpose the lengthwise walls of the splice casings have great tensile strength and armor wires are connected to the end walls, which serve as bulkheads, of the splice casings. To make connections whereby the tensile stresses in the flat wires, which may be very great, are transferred to the casing, both layers of wires are wrapped around a ring that is compressed between two plates. In practice this connection has proven too troublesome to make, to be completely satisfactory, and the double thickness of tapes cannot be gripped uniformly. An attempt to solve a similar problem is described in Lowe U.S. Pat. No. 1,246,964 wherein two concentric wedges fit over each other to clamp armor wires by wedging them under tension within a conical sleeve. The structure of the Lowe connection is objectionable in that the required elements are not readily machinable, special castings being required for the conical sleeve and wedges, and require a large radial displacement. More importantly, however, the Lowe connection does not provide positive clamping of the armor wires, since wedging action occurs only when they are under tension. Furthermore, when the armor is under tension the wires of the outer layer are pulled down against the wires of the inner layer and individual wires of the outer layer can be wedged between the wires in the inner layer with the result that tension is not evenly shared.

The flat armor wires of which the dimensions are disclosed in the above-referenced Kothe et al. application and which have particular applicability to the present invention are stiff and springy to an extent that makes splicing difficult, particularly when the cable has two layers of such armor. Adequate splicing tools and methods for making splices or securing such heavy armor wires to a bulkhead have not been known.

SUMMARY

We have invented an apparatus for securing inner and outer overlying layers of cable armor wires to a bulkhead, comprising a first heavy metal plate comprising a passageway for the cable along with the layers of armor covering it, and a second heavy metal plate comprising a passageway for the cable without the armor wires. The second plate has a concave area in its surface surrounding the passageway. Our apparatus also comprises a first metal ring that fits around the outer layer of the armor wires and comprises a flat surface facing toward the first plate and a convex surface facing away from the first plate. It further comprises a second heavy metal ring that fits around the inner layer of armor wires and is axially displaced from the first ring. This second ring comprises a concave surface matchingly facing toward the convex surface of the first ring and a convex surface that faces away from the first ring and matches the concave area of the second plate. Also our apparatus comprises means, such preferably as headed bolts that fit through smooth holes in the first plate and thread into matching tapped holes in the second plate, clampingly urging the first and second plates together thereby securing the armor wires of the outer layer between the first and second rings these wires having been folded radially around the first ring and securing the armor wires of the inner layer between the second ring and the second plate, these inner layer wires having been folded radially around the second ring. Finally means are provided to secure the second plate to the bulkhead.

To prevent slippage of the armor wires the concave area of the second plate, convex surface of the first ring and concave and convex surfaces of the second ring preferably all, and at least one, comprise circumferential ridges. Preferably, also, matching alignment holes are provided in the convex surface of the first ring and concave surface of the second ring with alignment pins in the holes to align the rings during assembly.

Our tool for securing armor wires of a cable into an apparatus including at least one ring member comprises first and second substantially half-cylindrical members, means for lockingly combining the half-cylindrical members around the cable thereby gripping the cable, and substantially semicircular radial projections on each of the half-cylindrical members, which projections combine to form a radial flange when the half-cylindrical members are combined around the cable. Our tool comprises a plurality of substantially uniformly spaced apertures through the flange and a like plurality of radial slots opening from the apertures. The width of the slots is sufficient to accept the wires but the diameters of the apertures greatly exceeds these widths so that wires introduced through the slots are retained in the apertures. Preferably, our tool will comprise semicircular recesses in the half-cylindrical members fitting a projection on the ring member for temporarily securing the ring member to the tool. It will also preferably comprise a marking notch around the semi-cylindrical members at their ends remote from the flange to guide the cutting of the wires.

In our method of securing the flat armor wires of a cable to a bulkhead we insert a cut end of the cable through an aperture in a first heavy metal plate and secure a split cylindrical wire holding tool around the cable between this plate and the cut end. The tool comprises a flange having a plurality of apertures and a like plurality of radial slots opening from the apertures and the tool is secured with its end remote from the flange facing the cut end of the cable. We then fit a heavy metal ring around the cable against the tool and bend each of the armor wires around the ring, over the tool and through one of the slots into one of the apertures and twist the wires thereby to retain them in the apertures. We bind the bended wires down upon the ring and sever them in a circumferential line around the ring. Finally, after removing the tool from the cable, advancing the first plate against the ring, inserting the cable through an aperture in a second heavy metal plate and urging the first and second plates together to compress them against the ring and the wires the second plate is secured to the bulkhead.

In our method of securing two concentric layers of flat wires of a cable to a bulkhead we insert a cut end of the cable through an aperture in a heavy metal plate and secure a split cylindrical wire-holding tool, as hereinabove, around the cable between the plate and the cut end. We fit a first heavy metal ring around the cable against the tool and bend each wire of an outer of the layers around the ring, over the tool, through one of the slots into one of the apertures and twist it to retain it in the aperture. We then fit a second heavy metal ring around the cable against the portions of the wires that have been bent around the first ring and bend each wire of an inner of the layers around the second ring, over the tool, through one of the slots into one of the apertures and twist it to retain it in the aperture. We bind the bended wires of both layers down upon the first ring, sever the bended wires of both layers in a circumferential line around the first ring, remove the tool from the cable and advance the first plate against the first ring. We then insert the cable through an aperture in a second heavy metal plate, urge the plates together to compress the wires of the outer layer between the rings and the wires of the inner layer between the second ring and the second plate and secure the second plate to the bulkhead.

DETAILED DESCRIPTION OF PREFERRED EMBODIMENT

Figure 1:
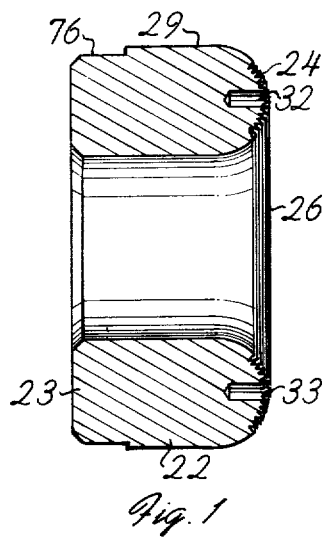
FIG. 1 shows a section of a first ring comprised in our apparatus.
Figure 2:
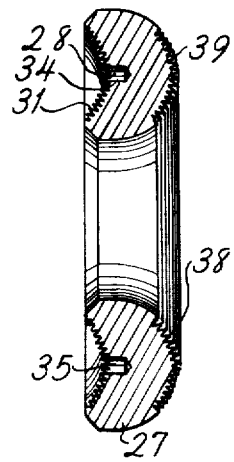
FIG. 2 shows a section of a second ring comprised in our apparatus.
Figure 3:
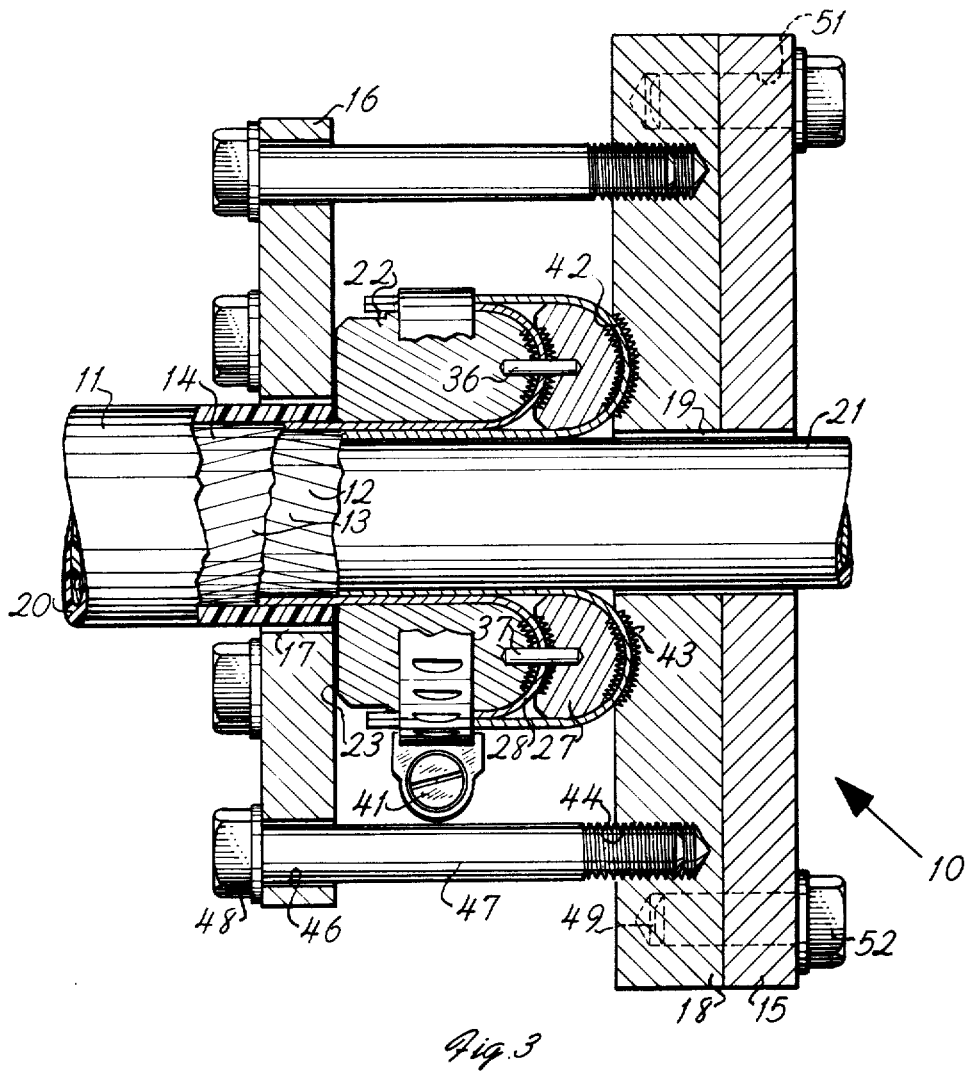
FIG. 3 shows a sectionalized lengthwise view of our apparatus.

Referring to FIG. 3 in our apparatus, indicated generally by the numeral 10, a cable 11 with an inner layer 12 of flat armor wires 13, an outer layer 14, comprising the identical type of wires, and a jacket 20 has the armor wires connected to a bulkhead 15 which forms a wall of a splice casing, not shown. A heavy steel plate 16 has a passageway 17 fitting over the layer 14 and jacket 20, and a second heavy steel plate 18 has a passageway 19 fitting over a cable core 21 without the armor wires. A heavy steel ring 22 (see also FIG. 1) has a flat surface 23 that faces and fits against the plate 16. The ring 22 also has a convex surface 24 which is conveniently semicircular in section and is circumferentially cut with a plurality of fine ridges 26 to increase its gripping effect, as shall be further explained. A second heavy steel ring 27 (see FIG. 2) is axially displaced from the ring 22 but engages the ring 22 by virtue of a concave surface 28 having the same or slightly greater radius of curvature, in section, as the surface 24. Flat wires 13 of the outer layer 14 are folded over the ring 22 around the convex surface 24 and back against a cylindrical surface 29 of the ring 22 which is elongated in section sufficiently to provide an adequate surface 29. The surface 28 has circumferential ridges 31 which cooperate with the ridges 26 to grip the folded-over wires. Two alignment holes 32, 33 spaced 180° apart in the ring 22 and matching alignment holes 34, 35 in the ring 27 receive two pins 36, 37 that support the ring 27 during the making of a connection and keep it properly centered. The ring 27 has a convex surface 38 with circumferential ridges 39 and the flat wires from the inner layer 12 are folded over the ring 27 around the surface 38 back over the surface 29 where all the folded-back wires 13 are held by a hose clamp 41. A concave area 42 in the plate 18 matches the convex surface 38 of the ring 27. This area 42 is also cut to form ridges 43. The plate 18 has six tapped holes 44 matching six smooth holes 46 in the plate 16 by which the plates can be compressed together by means of bolts 47 having heads 48 to clamp the rings 22, 27 between them and firmly grip the wires 13. Six additional tapped holes 49 in the plate 18, matching smooth holes 51 in the bulkhead 15 enable the plate 18, and thus the apparatus 10 to be applied to the bulkhead by means of bolts 52.

Armor wires, particularly heavy flat armor wires such as the wires 13 are not easily bent or otherwise manipulated and the making of terminations or splices in heavy armored cables can be very difficult particularly where the bulkhead, to which the armor is to be attached, is awkwardly placed. In our apparatus the entire assembly can be completed first in a convenient position and only then need attachment be made to the bulkhead by means of the bolts 52. Since the diameters of the rings 22, 27 exceed the diameter of the cable 11, it is clear that when the armor wires, which cover the surface of the cable, are folded around the rings, there will be sufficient circumference of the rings to permit the wires to be folded without overlapping. Thus each of the wires 13 in the layer 14 will be gripped individually between the surfaces 24, 28 and each of the wires in the layer 12 will be gripped individually between the surfaces 38, 42. The bolts 47 can be tightened to grip the wires against any desired amount of wire tension, and tension in the armor wires, such as that imposed by pulling forces on the cable, will have no tendency to relieve any of the wires from the gripping surfaces such as would occur if the wires were superimposed upon each other within the gripping surfaces. It is convenient to fix the pins 36, 37 permanently into the holes 32, 33 as by press fitting and provide a slide fit into the holes 34, 35. The ring 27 need then be fitted over the pins only after the wires of the outside layer have been folded into position around the ring 22.

Figure 4:
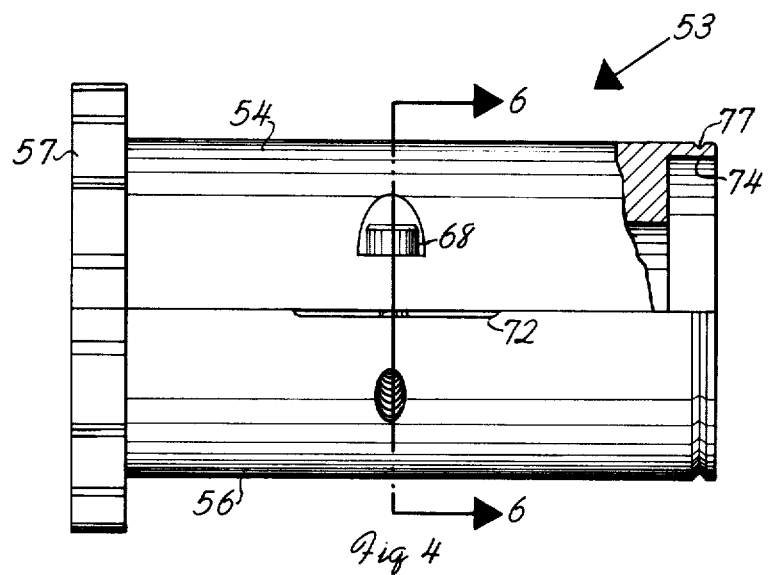
FIG. 4 shows a side view of a tool of our invention.
Figure 5:
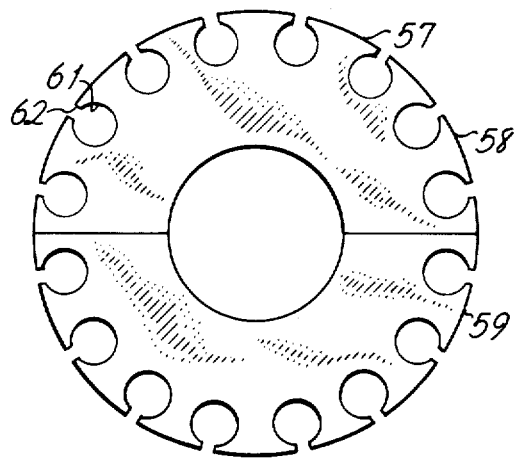
FIG. 5 shows an end view of the tool of FIG. 4.
Figure 6:
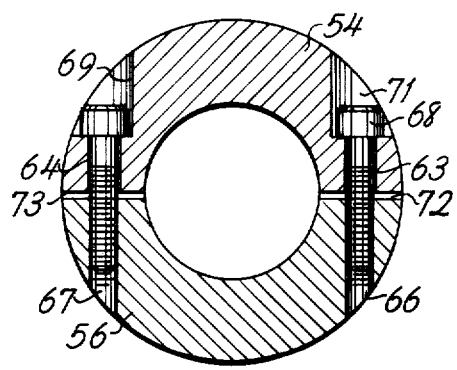
FIG. 6 shows a section through the lines 6—6 of FIG. 4.

We have found that the implementation of our apparatus 10 is greatly facilitated by the use of a tool indicated generally by the numeral 53 (FIGS. 4–6). The tool 53 is made up of two heavy metal half-cylinders 54, 56 the mating portions of which have been slightly planed to provide tighter gripping action around the cable 11. A flange 57 forms from two radial semicircular projections 58, 59 of the half-cylinders 54, 56. The flange 57 has a plurality of uniformly distributed apertures 61, each with a radial slot 62 opening from it. The number and size of the apertures 61 is sufficient to hold all of the wires 13 although it may be necessary to place more than one wire in some or all of the apertures. The apertures 61 are conveniently circular so that they can be conventionally drilled, but other shapes can be used particularly, for round armor wires, shapes that do not curve into the slot openings. The diameters of the apertures 61 are much larger than the widths of the slots 62 being, preferably, at least three times as large. For flat armor wires 0.20 × 0.05 inch the slots 62 are 0.10 inch wide and the diameters of the apertures 61 are 0.32 inch. Smooth holes 63, 64 in the half-cylinder 54 and tapped holes 66, 67 in the half-cylinder 56 permit the half-cylinders to be clamped and tightened around the cable by means of headed bolts of which a bolt 68 is shown in FIG. 4.

Reliefs 69, 71 provide clearance for the boltheads. Slots 72, 73 in the half-cylinder 56 provide convenient means for prying apart the half-cylinders, as with a screwdriver. A countersink 74 provided by recesses in the half-cylinders matches as a projection 76 of the ring 22 and a v-notch 77 in the portion of the tool overlapping the projection 76 serves as a guide for cutting the wires, as shall be shown. It is important that the notch 77 should be so placed on the tool 53 that cut ends of the wires not project beyond the ring 22 and prevent the surface 23 from seating against the plate 16.

Figure 7:
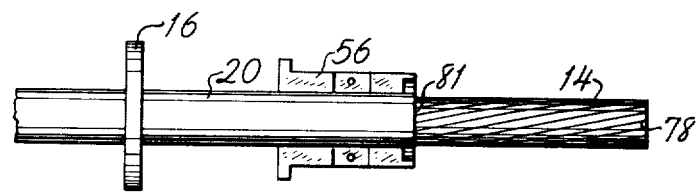
FIGS. 7a–7l show steps of a method of our invention.
Figure 7:
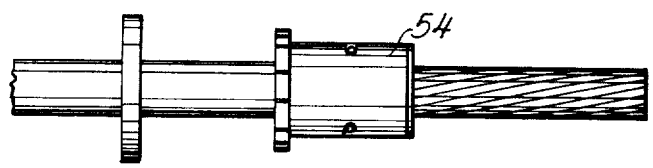
Figure 7:
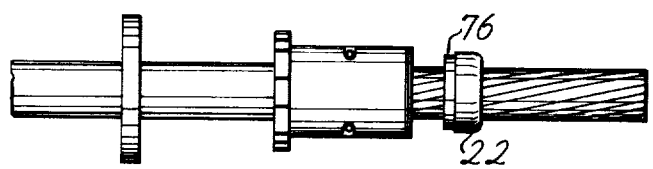
Figure 7:
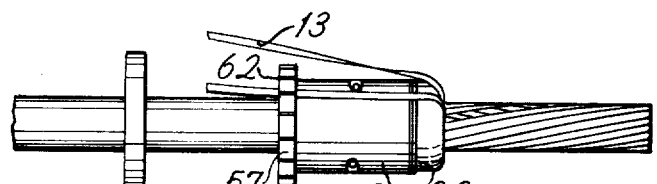
Figure 7:
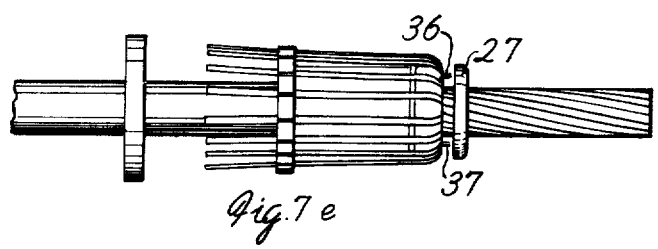
Figure 7F:
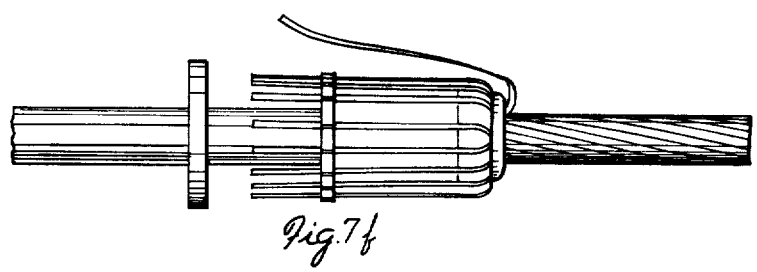
Figure 7G:
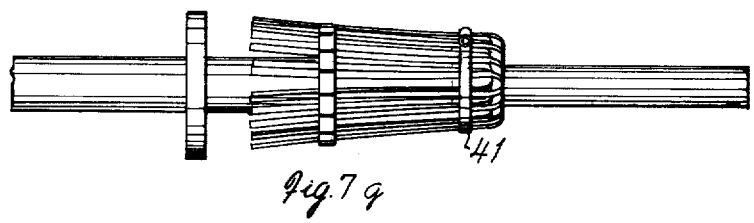
Figure 7H:
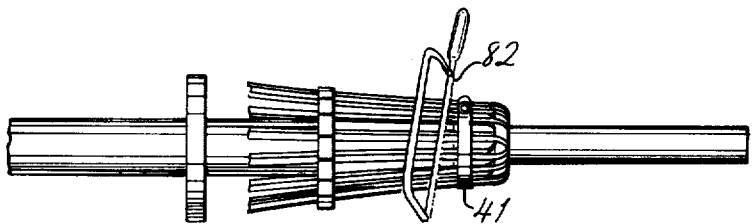
Figure 7I:
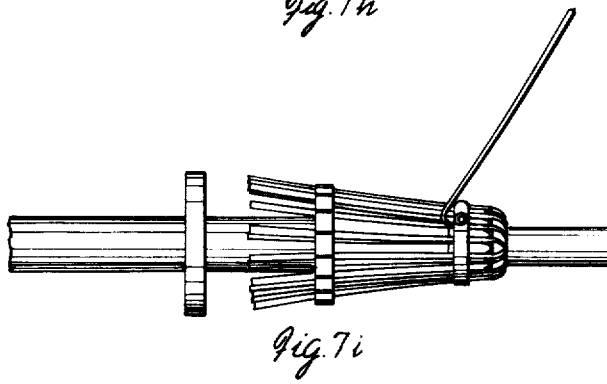
Figure 7J:
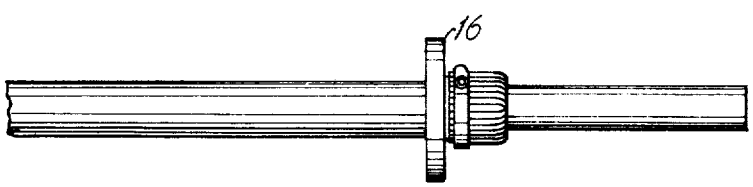
Figure 7K:
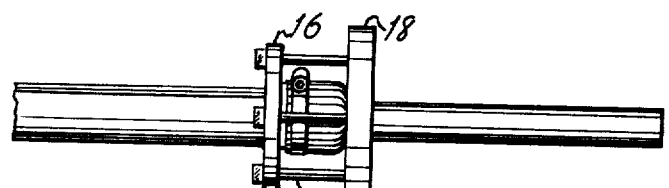
Figure 7L:
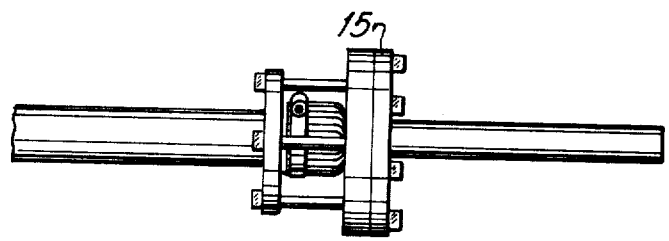

A method of using our apparatus 10 to secure a double layer of armor wires to the bulkhead 15 is shown in FIGS. 7a–7l. In FIG. 7a a cut end 78 of the cable 11 has been inserted through the passageway 17 of the plate 16. The plastic jacket 20 over the armor wires has been removed to a point 81 and the half-cylinder 56 fitted over the jacket 20 and the armor wires to the point 81. The mating half-cylinder 54 is then locked against the member 56 by means of bolts of the type of the bolt 68 (FIG. 7b). Absent any jacket 20 the tool 53 will be applied directly over the outer layer 14 of armor wires. The ring 22 is then fitted over the layer 14 (FIG. 7c) and the projection 76 inserted into the countersink 74. Each of the flat wires 13 of the outer layer 14 is seized at the cut end 78 folded over the ring 22 (FIG. 7d) and tool 53 and inserted into one of the slots 62. This is accomplished without interference of the pins 36, 37 by spreading apart the wires to bypass the pins. To enter the slots 62 the long dimensions of the wires 13 must be radial but after they have been inserted into the apertures 61 the wires are turned so that the long dimensions are circumferential, securing them in the flange 57. After all the wires 13 in the layer 14 have been thus folded over the ring 22 and into the apertures 61 the ring 27 is fitted (FIG. 7e) onto the pins 36, 37, singly against the folded-over wires. The wires 13 of the layer 12 are then folded (FIG. 7f) over the ring 27 and secured, as before, through the slots 62 into the apertures 61. The hose clamp 41 is applied (FIG. 7g) over all the wires and tightened against the ring 22. First the wires of the layer 12 and then later the wires of the layer 14 are partially cut through (FIG. 7h) with a hack-saw 82 or equivalent tool using the v-notch 77 as a guide. After the wires of each layer have been cut, each of the individual wires is broken by repeated bending (FIG. 7i) at its partially cut section. The cut ends of the wires 13 having been discarded the tool 53 is removed after loosening the bolts 68 and the plate 16 brought forward against the flat surfaces 23 (FIG. 7j). For the plate 16 to abut against the surface 23 it is essential that none of the wires 13 should protrude from this surface. This has been accomplished by having the notch 77 in a portion of the tool 53 overlapping the projection of the ring 22. The plate 18 is then fitted over the cable, brought up to the wires that have been folded over the ring 27 (FIG. 7k) so that the wires enter the concave area 42. The bolts 47 are then inserted and tigthened with a torque wrench to 100 foot-pounds torque, drawing the plates 16 and 18 together to clamp the wires 13 securely. This plate 18 is finally bolted to the bulkhead 15 by means of the bolts 52 (FIG. 7l). Where the bulkhead 15 is comprised of flanges of a split splice casing, as described in the aforementioned application Ser. No. 116,845, the core of the cable will be spliced in an appropriate manner prior to bolting the plate 18 to the bulkhead 15. Appropriate methods of splicing cable cores are known and do not comprise a novel element of the present invention.

The foregoing description of our apparatus and method has been exemplary rather than definitive of our invention for which we desire an award of Letters Patent as defined in the following claims.

We claim:

1. The method of securing flat armor wires of a cable to a bulkhead comprising the steps of:
   A. inserting a cut end of said cable through an aperture in a first heavy metal plate,
   B. securing a slit cylindrical wire holding tool around said cable between said plate and said end, said tool comprising a flange having a plurality of apertures and a like plurality of radial slots opening from said apertures, the end of said tool remote from said flange facing said cut end,
   C. fitting a heavy metal ring around said cable against said tool,
   D. bending each of said armor wires around said ring, over said tool and through one of said slots into one of said apertures and twisting said wires thereby retaining them in said apertures,
   E. binding and securing the bent wires down upon said ring with a clamping means,
   F. severing the bent wires in a circumferential line around said ring and on the side of said clamping means adjacent said tool apertures,
   G. removing said tool from said cable and advancing said first plate against said ring,
   H. inserting said cable through an aperture in a second heavy metal plate,
   I. urging together said first and said second plates thereby compressing said plates against said ring and said wires, and
   J. securing said second plate to said bulkhead.

2. The method of securing two concentric layers of flat armor wires of a cable to a bulkhead comprising the steps of:
   A. inserting a cut end of said cable through an aperture in a heavy metal plate,
   B. securing a split cylindrical wire-holding tool around said cable between said plate and said end, said tool comprising a flange having a plurality of apertures and a like plurality of radial slots opening from said apertures, the end of said tool remote from said flange facing said cut end,
   C. fitting a first heavy metal ring around said cable against said tool,
   D. bending each wire of an outer of said layers around said ring, over said tool, through one of said slots into one of said apertures and twisting said wires thereby retaining them in said apertures,
   E. fitting a second heavy metal ring around said cable against the portions of said wires bent around said first ring,
   F. bending each wire of an inner of said layers around said second ring, over said tool, through one of said slots into one of said apertures and twisting said wires thereby retaining them in said apertures,
   G. binding and securing the wires of both of said layers down upon said first ring with a clamping means bent,
   H. severing the bent wires of both of said layers in a circumferential line around said first ring and on the side of said clamping means adjacent said tool apertures, I. removing said tool from said cable and advancing said first plate against said first ring, J. inserting said cable through an aperture in a second heavy metal plate, K. urging together said first and said second plates thereby compressing said outer layer of wires between said rings and said inner layer of wires between said second ring and said second plate, and L. securing said second plate to said bulkhead.

* * * * *